(12) United States Patent
Koros et al.

(10) Patent No.: US 6,932,859 B2
(45) Date of Patent: Aug. 23, 2005

(54) CROSSLINKED AND CROSSLINKABLE HOLLOW FIBER MEMBRANE AND METHOD OF MAKING SAME

(75) Inventors: William J. Koros, Atlanta, GA (US); David Wallace, Dunwoody, GA (US); John D. Wind, Seattle, WA (US); Stephen J. Miller, San Francisco, CA (US); Claudia Staudt-Bickel, Heidelberg (DE)

(73) Assignees: Chevron USA Inc, San Ramon, CA (US); University of Texas System, Austin, TX (US)

(*) Notice: Subject to any disclaimer, the term of this patent is extended or adjusted under 35 U.S.C. 154(b) by 12 days.

(21) Appl. No.: 10/323,091

(22) Filed: Dec. 18, 2002

(65) Prior Publication Data

US 2003/0221559 A1 Dec. 4, 2003

Related U.S. Application Data

(63) Continuation-in-part of application No. 10/032,255, filed on Dec. 20, 2001, now abandoned.

(51) Int. Cl.⁷ .......................... B01D 53/22; B01D 69/08; B01D 71/40
(52) U.S. Cl. ............................. 96/10; 96/14; 55/524; 55/DIG. 5
(58) Field of Search .................. 95/45, 51, 54; 96/4, 8, 10, 13, 14; 55/524, DIG. 5

(56) References Cited

U.S. PATENT DOCUMENTS

| | | | |
|---|---|---|---|
| 3,567,632 A | 3/1971 | Richter et al. | 210/23 |
| 4,230,463 A | 10/1980 | Henis et al. | 55/16 |
| 4,427,419 A * | 1/1984 | Li | 95/51 |
| 4,474,858 A * | 10/1984 | Makino et al. | 428/473.5 |
| 4,512,893 A * | 4/1985 | Makino et al. | 210/500.28 |
| 4,690,873 A * | 9/1987 | Makino et al. | 96/10 |
| 4,705,540 A * | 11/1987 | Hayes | 95/51 |
| 4,717,393 A * | 1/1988 | Hayes | 95/51 |
| 4,717,394 A * | 1/1988 | Hayes | 95/49 |
| 4,728,345 A | 3/1988 | Murphy | 55/158 |
| 4,740,219 A * | 4/1988 | Kulprathipanja et al. | 95/51 |
| 4,838,900 A * | 6/1989 | Hayes | 95/54 |
| 4,857,079 A * | 8/1989 | Kimura | 95/54 |
| 4,880,442 A * | 11/1989 | Hayes | 95/51 |
| 4,925,459 A * | 5/1990 | Rojey et al. | 95/50 |
| 4,952,220 A * | 8/1990 | Langsam et al. | 96/13 |
| 5,042,992 A * | 8/1991 | Blinka et al. | 95/51 |
| 5,055,116 A * | 10/1991 | Kohn et al. | 95/47 |
| 5,071,452 A * | 12/1991 | Avrillon et al. | 95/47 |
| 5,074,891 A * | 12/1991 | Kohn et al. | 95/47 |
| 5,076,816 A * | 12/1991 | Avrillon et al. | 95/51 |
| 5,076,817 A * | 12/1991 | Hayes | 95/47 |
| 5,085,676 A | 2/1992 | Ekiner et al. | 55/158 |
| 5,104,532 A | 4/1992 | Thompson et al. | 210/224 |
| 5,178,650 A * | 1/1993 | Hayes | 95/47 |
| 5,234,471 A * | 8/1993 | Weinberg | 95/47 |
| 5,248,319 A * | 9/1993 | Ekiner et al. | 95/54 |
| 5,266,100 A * | 11/1993 | Simmons | 95/43 |
| 5,286,280 A | 2/1994 | Chiou | 95/45 |
| 5,288,304 A | 2/1994 | Koros et al. | 95/45 |
| 5,310,415 A | 5/1994 | Simmons et al. | 95/45 |
| 5,591,250 A | 1/1997 | Stern et al. | 95/51 |
| 5,725,769 A | 3/1998 | Miller et al. | 210/500.39 |
| 5,922,104 A | 7/1999 | Park et al. | 95/51 |
| 5,928,410 A | 7/1999 | Jois et al. | 95/51 |
| 5,969,087 A | 10/1999 | Maeda | 528/353 |
| 5,972,080 A | 10/1999 | Nagata | 96/13 |
| 6,168,649 B1 | 1/2001 | Jensvold et al. | 95/47 |
| 6,299,669 B1 * | 10/2001 | Koros et al. | 95/51 |
| 6,383,258 B1 | 5/2002 | Simmons | 95/45 |
| 6,464,755 B2 | 10/2002 | Nakanishi et al. | 95/52 |
| 6,562,110 B2 * | 5/2003 | Koros et al. | 96/4 |
| 6,585,802 B2 * | 7/2003 | Koros et al. | 95/51 |

FOREIGN PATENT DOCUMENTS

EP    0459623 B1 *  6/1994

OTHER PUBLICATIONS

Koros et al., "Membrane–Based Gas Separation", J. Membrane Sci. 83 (1993) pp. 1–80.
E.M. Flanigen et al., "Silicalite, A New Hydrophobic Crystalline Silica Molecular Sieve", Nature, vol. 271 (1978) pp. 512–516.
D.W. Breck, "The Molecular Sieve Effect",Zeolite Molecular Sieves, Wiley (1974) pp. 635–637.
Prasad et al., "Evolution of Membranes in Commercial Air Separation", J. Membrane Sci., 94 (1994) 225–248.

* cited by examiner

*Primary Examiner*—Robert H. Spitzer
(74) *Attorney, Agent, or Firm*—D. M. Tuck

(57) ABSTRACT

A composition of and a method of making high performance hollow fiber membranes is described. The membranes have a high resistance to plasticization by use of a predetermined amount of crosslinking. The preferred polymer material for the membrane is a polyimide polymer comprising covalently bonded ester crosslinks. The resultant hollow fiber membrane exhibits a high permeability of $CO_2$ in combination with a high $CO_2/CH_4$ selectivity. Another embodiment provides a method of making the hollow fiber membrane from a monoesterified polymer followed by final crosslinking after hollow fiber formation.

23 Claims, 9 Drawing Sheets

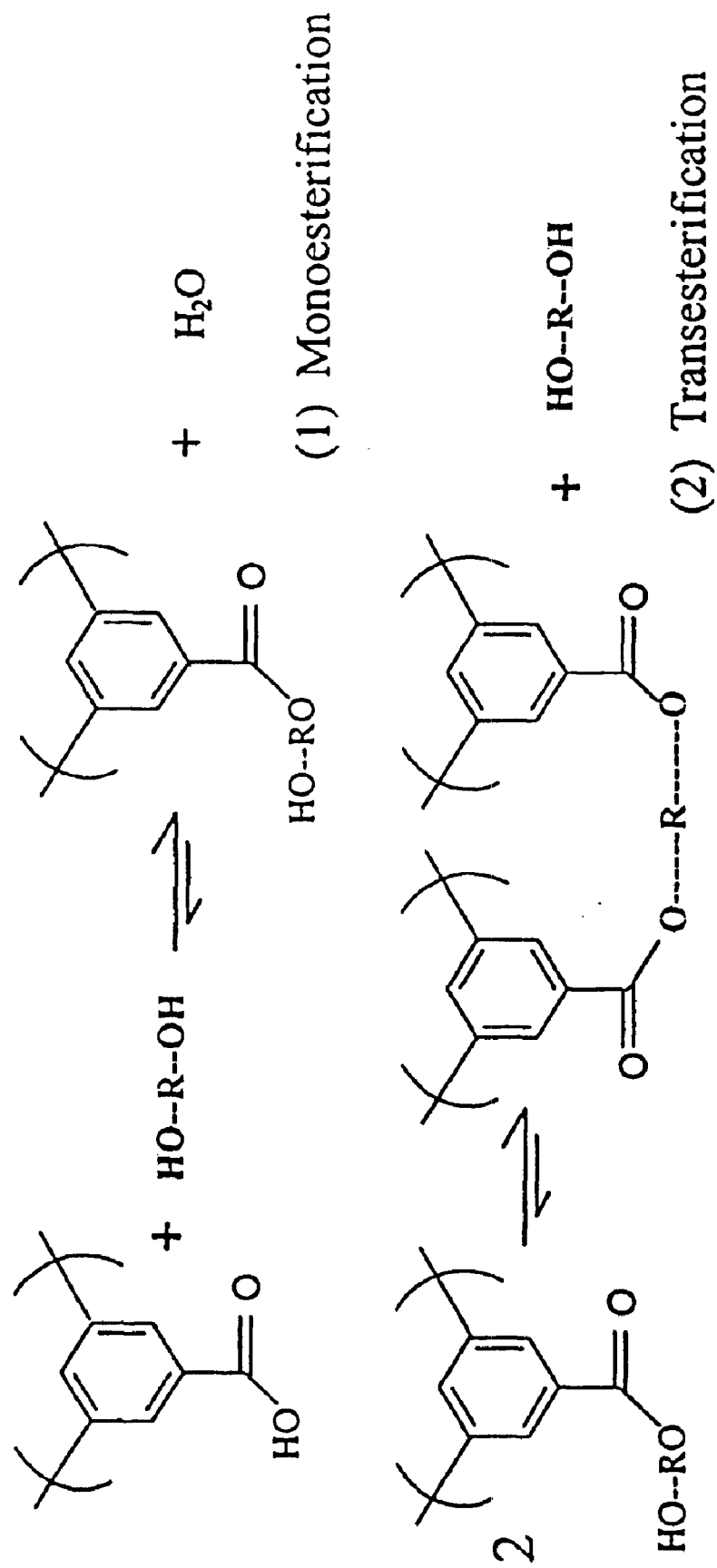
Figure 1 Monoesterification and Transesterification Reactions

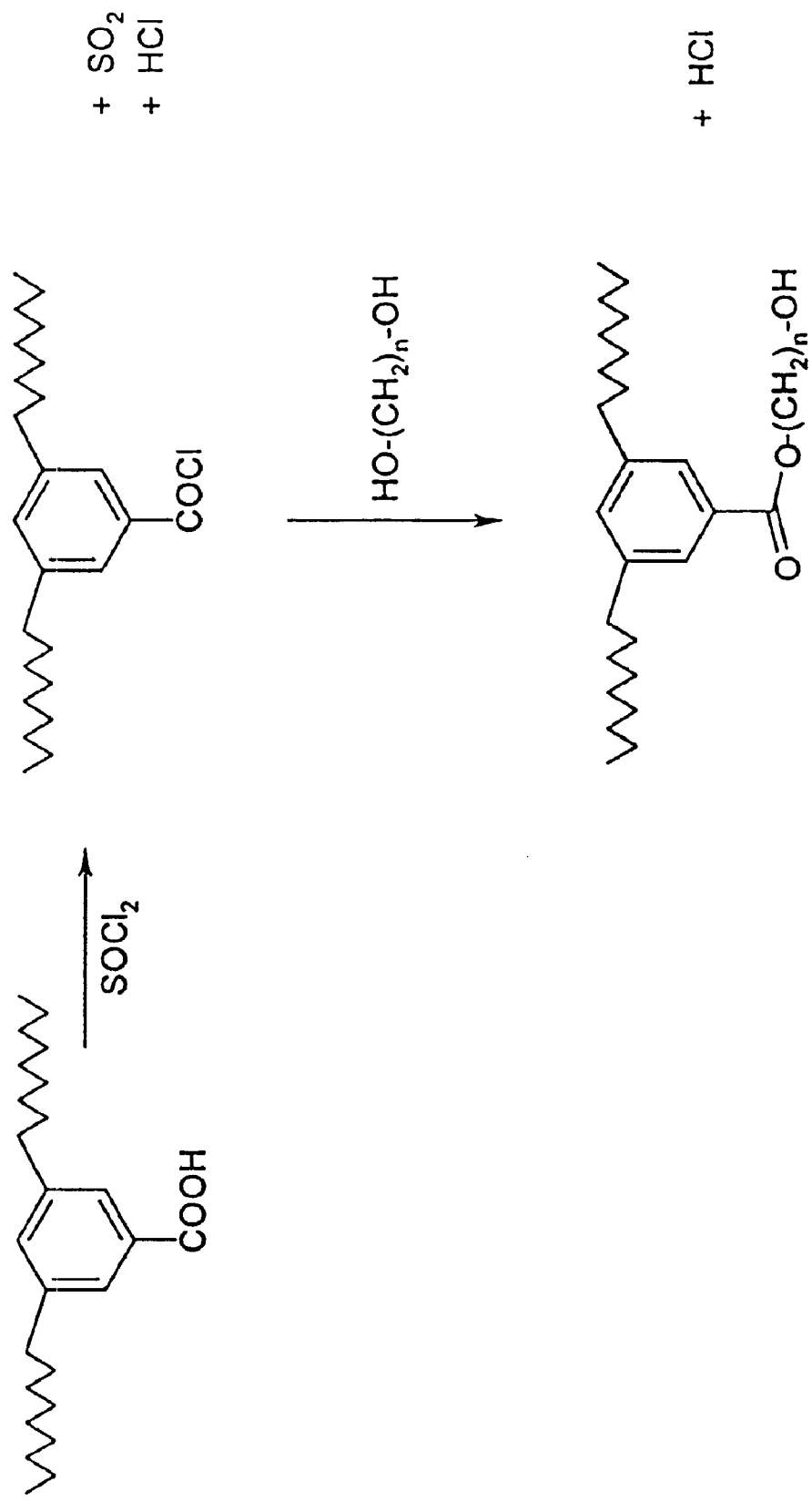
Figure 2 Synthesis of the monoester over the acid chloride copolyimde

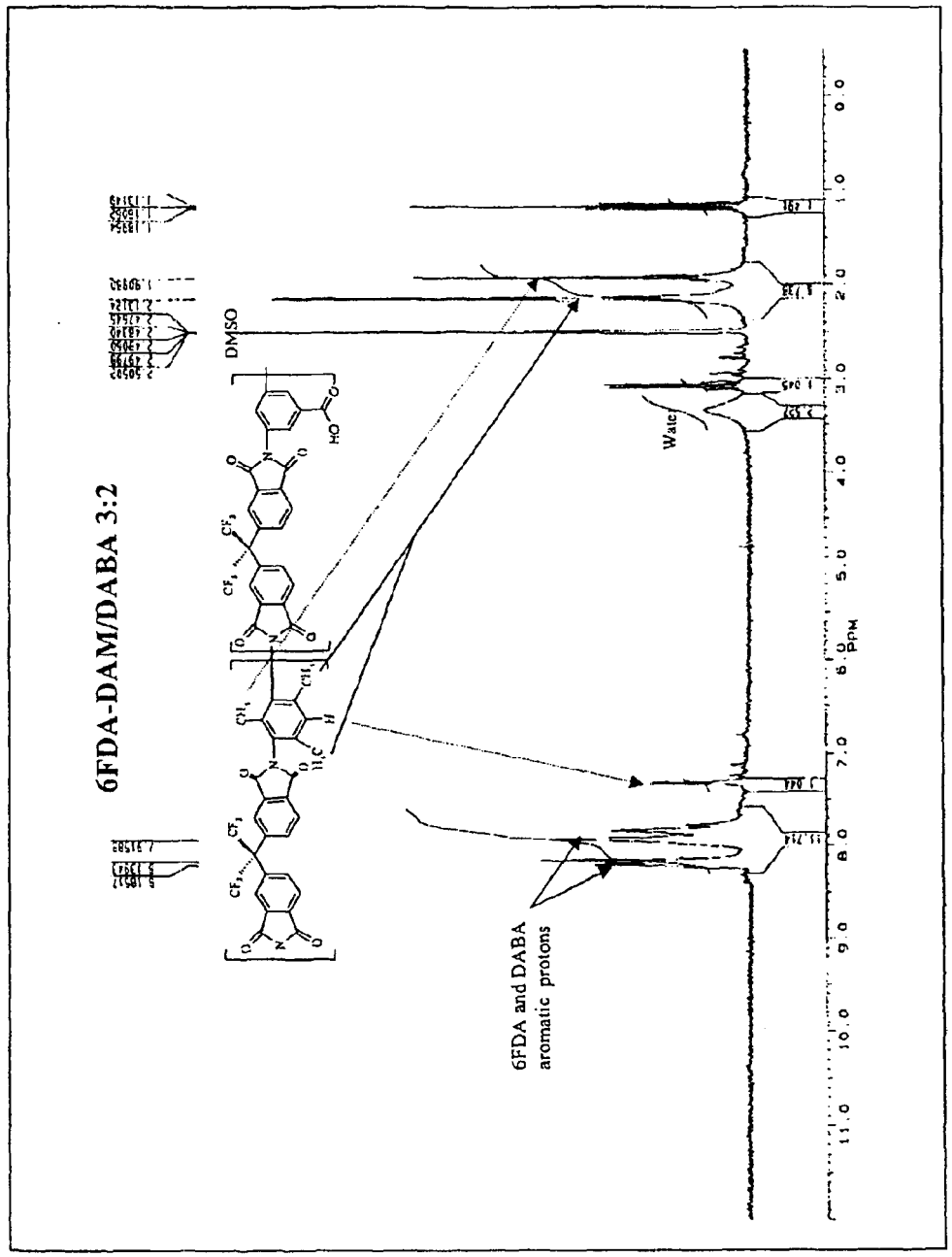
Fig. 3 $^1$H NMR of the 6FDA-DAM/DABA 3:2 non-crosslinked (before monoesterification)

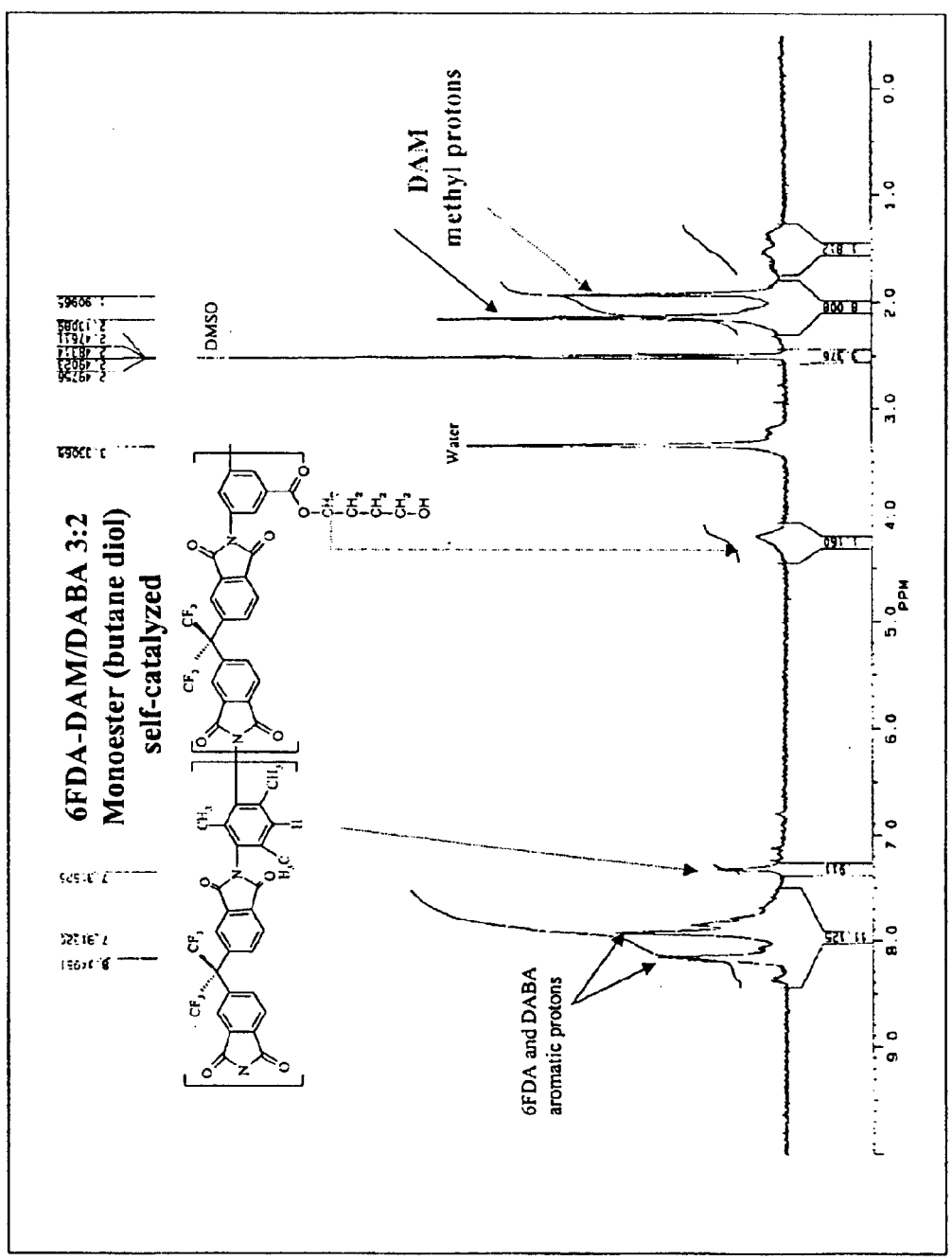
Fig. 4 $^1$H NMR of the 6FDA-DAM/DABA 3:2 monester with 1,4-butanediol

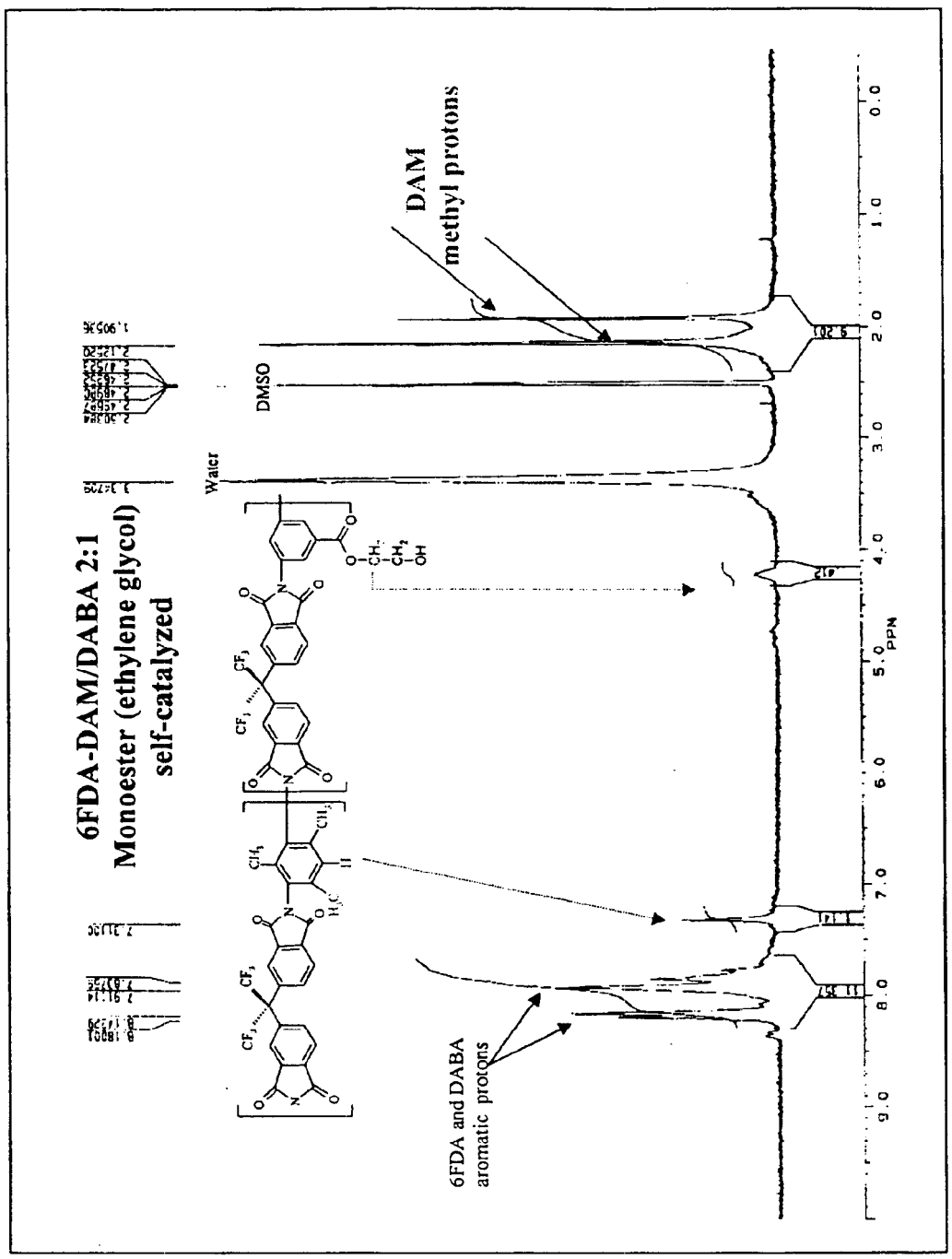
Fig. 5 ¹H NMR of the 6FDA-DAM/DABA 2:1 monoester with ethylene glycol

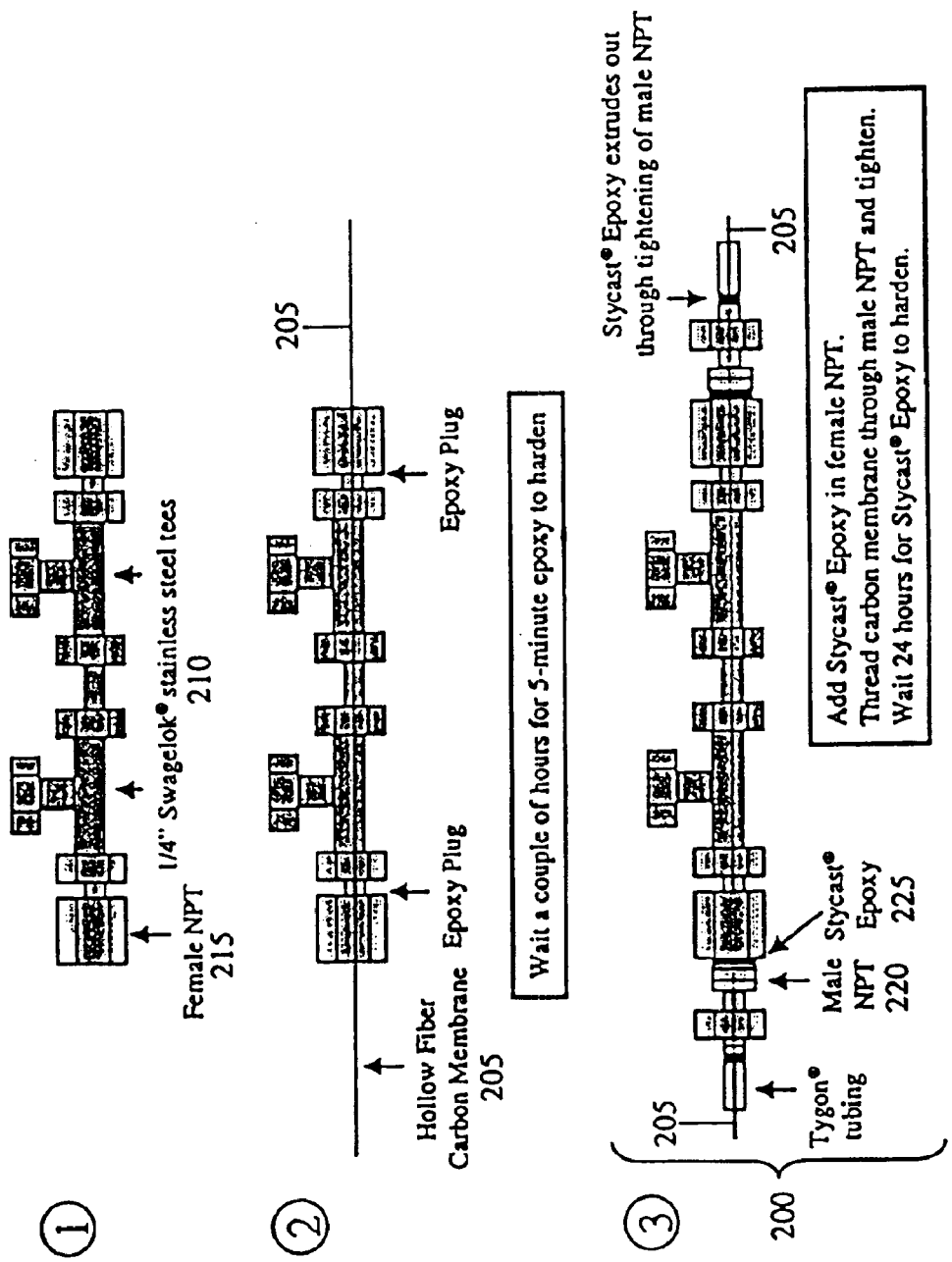
Figure 6 Single Fiber Test Module

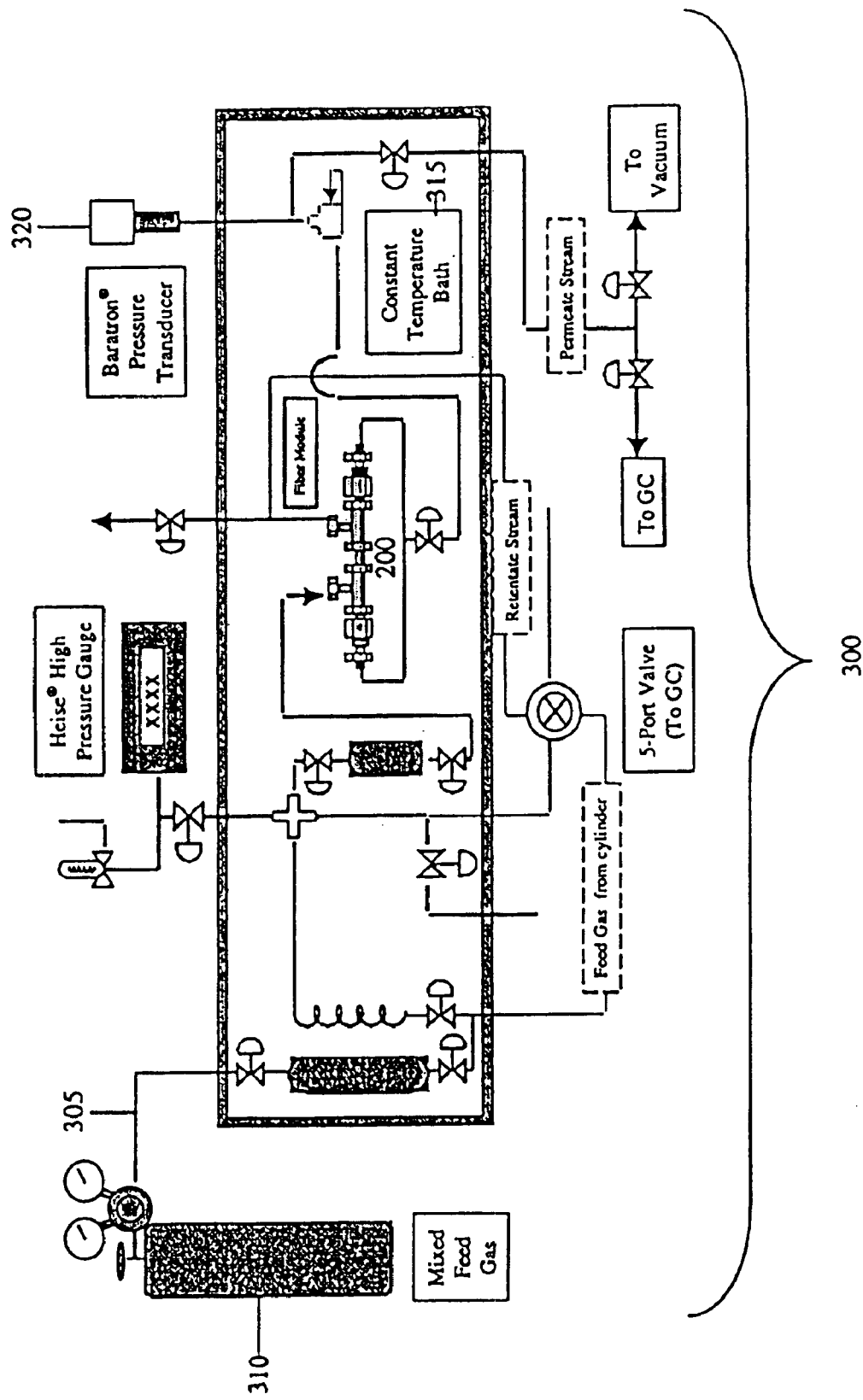
Figure 7 Permeation testing system for membrane fiber modules.

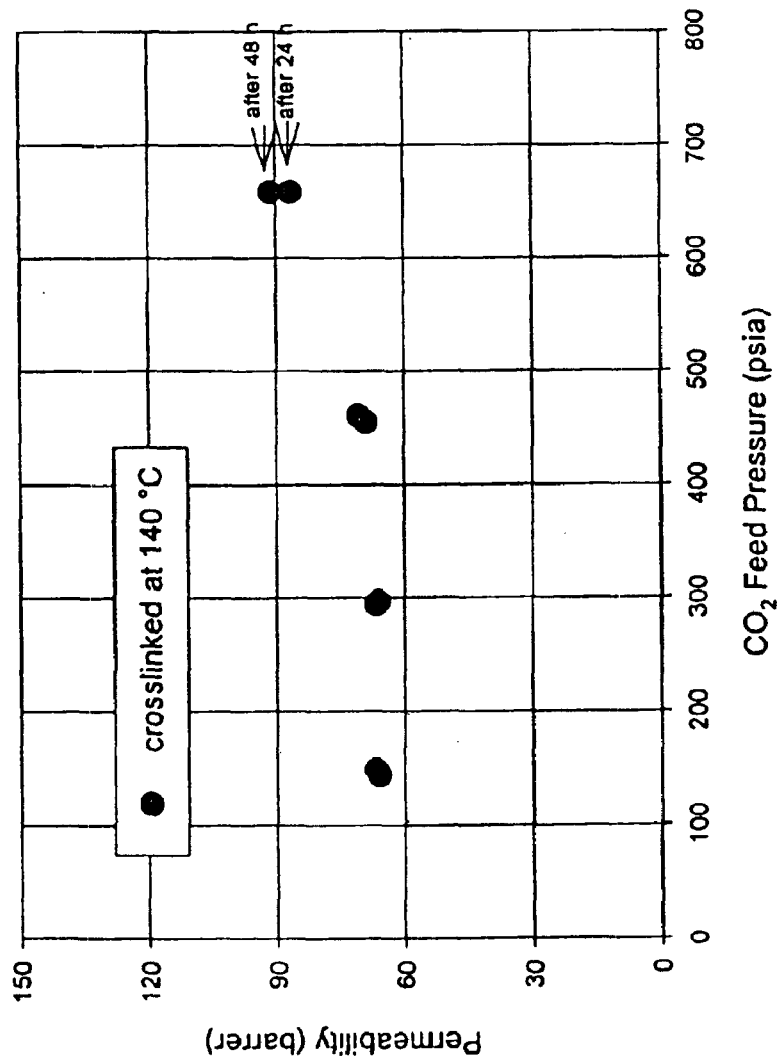
Fig. 8 CO₂ permeability for the 6FDA-DAM/DABA 3:2 crosslinked with 1,4-butanediol (over the acid chloride route at 140°C)

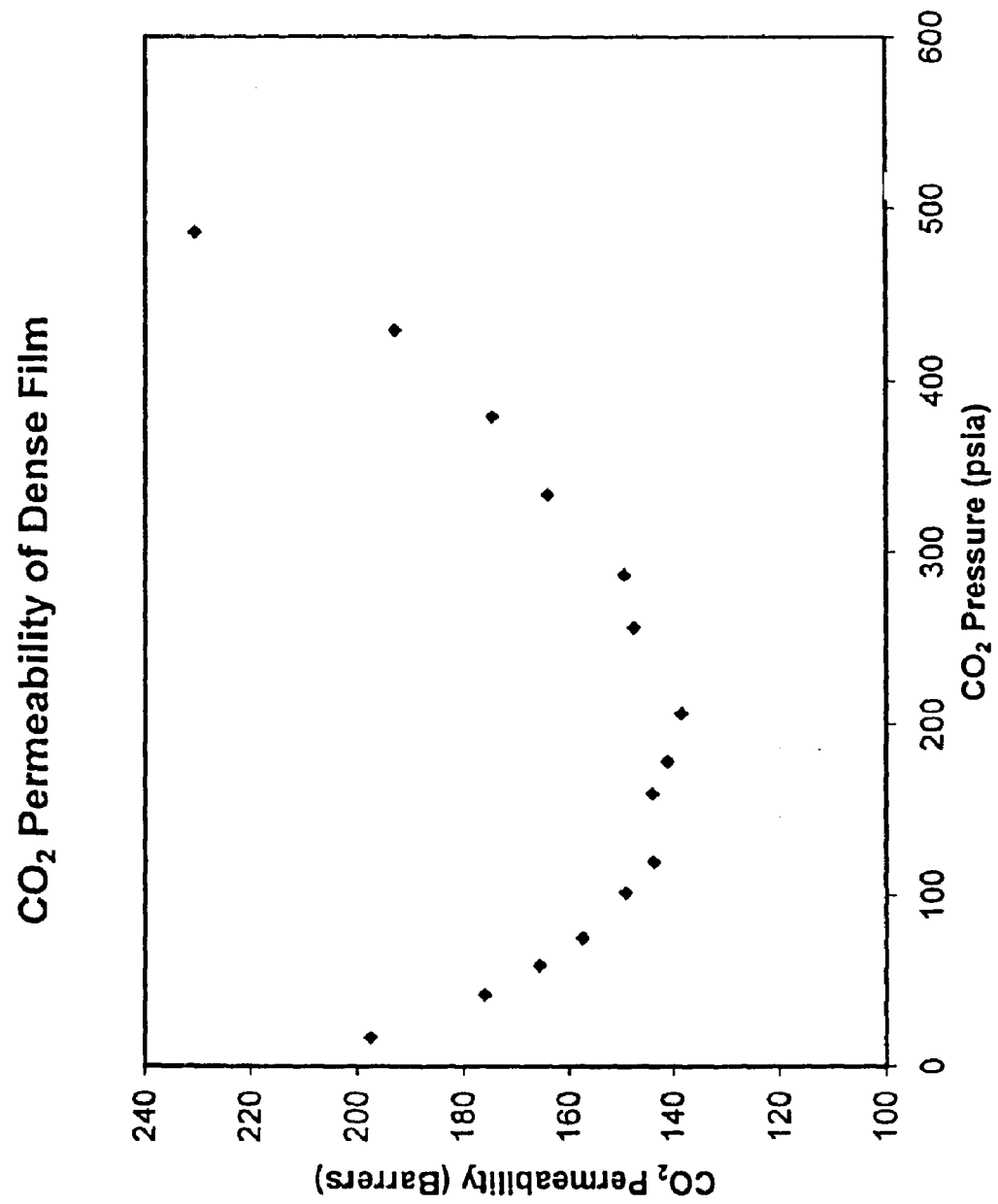
Figure 9  CO$_2$ Permeability for Uncrosslinked Film

CROSSLINKED AND CROSSLINKABLE HOLLOW FIBER MEMBRANE AND METHOD OF MAKING SAME

CROSS REFERENCE TO RELATED APPLICATIONS

This application is a continuation in part of U.S. Ser. No. 10/032,255 filed on Dec. 20, 2001 now abandoned.

FIELD OF THE INVENTION

The present invention relates to the separation of mixtures using polymer membranes.

BACKGROUND

Polymer membranes have been proposed for various separations. It has been found that different molecules can be made to diffuse through selected polymers differently. For example if one component of a mixture is found to diffuse through a polymer rapidly and a second component is found to diffuse through the polymer very slowly or not at all, the polymer may be utilized to separate the two components. Polymer membranes potentially can be used for gas separations as well as liquid separations.

Polymeric membrane materials have been found to be of use in gas separations. Numerous research articles and patents describe polymeric membrane materials (e.g., polyimides, polysulfones, polycarbonates, polyethers, polyamides, polyarylates, polypyrrolones, etc.) with desirable gas separation properties, particularly for use in oxygen/nitrogen separation (See, for example, Koros et al., *J. Membrane Sci.*, 83, 1–80 (1993), the contents of which are hereby incorporated by reference, for background and review).

The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

The relative ability of a membrane to achieve the desired separation is referred to as the separation factor or selectivity for the given mixture. There are however several other obstacles to use of a particular polymer to achieve a particular separation under any sort of large scale or commercial conditions. One such obstacle is permeation rate. One of the components to be separated must have a sufficiently high permeation rate at the preferred conditions or else extraordinarily large membrane surface areas are required to allow separation of large amounts of material. Another problem that can occur is that at conditions where the permeability is sufficient, such as at elevated temperatures or pressures, the selectivity for the desired separation can be lost or reduced. Another problem that often occurs is that over time the permeation rate and/or selectivity is reduced to unacceptable levels. This can occur for several reasons. One reason is that impurities present in the mixture can over time clog the pores, if present, or interstitial spaces in the polymer. Another problem that can occur is that one or more components of the mixture can alter the form or structure of the polymer membrane over time thus changing its permeability and/or selectivity. One specific way this can happen is if one or more components of the mixture causes plasticization of the polymer membrane. Plasticization occurs when one or more of the components of the mixture acts as a solvent in the polymer often causing it to swell and lose its membrane properties. It has been found that polymers such as polyimides which have particularly good separation factors for separation of mixtures comprising carbon dioxide and methane are prone to plasticization over time thus resulting in decreasing performance of the membranes made from the polyimides.

The present invention overcomes some of the problems of the prior art membranes by providing a polymer membrane and a route to making said polymer membrane that has the following properties/advantages:

a) Excellent selectivity and permeability, b) Sustained selectivity over time by resistance to plasticization, and c) Very large useable surface area by use of hollow fibers.

SUMMARY

As discussed above the present invention seeks to provide a membrane and method of making the membrane that achieves the result of providing a commercially viable polymer membrane that overcomes some of the drawbacks of the prior art membranes. The membranes of the present invention can have very large available surface areas using hollow fiber technology. The membranes of the present invention also have a very high selectivity at a very high permeability. The membranes of the present invention also are quite resistant to plasticization and maintain their selectivity and permeability properties over time as is required in commercial applications of this technology. The membrane of the present invention achieves this result by providing a predetermined number of crosslinkable sites in the polymer chain and by crosslinking the polymer membrane using selected crosslinking agents.

In one embodiment of the present invention a hollow fiber polymer membrane is provided, comprising; a crosslinked polyimide polymer having covalent ester crosslinks; and having a $CO_2$ permeance of at least 20 GPU and a $CO_2/CH_4$ selectivity of greater than 20, when measured at 35 degrees C. and a pressure of 100 psia.

The productivity (permeance) of a gas separation membrane is measured in GPUs which is defined as follows:

$$GPU = \frac{10^{-6} \times cm^3 \text{ (STP)}}{cm^2 \times sec. \times (cm. \ Hg)}$$

In an alternative embodiment of the present invention a hollow fiber polymer membrane is provided, comprising: a crosslinked polyimide polymer having at least some covalent ester crosslinks and having a ratio of crosslinkable sites to imide groups of between 3:8 and 1:16. It has been found that too much crosslinking can cause the hollow fiber polymer to be fragile and can also result in poor membrane performance. Too little crosslinking can lead to plasticization of the polymer membrane over time resulting in deteriorating performance and loss of selectivity.

In another alternative embodiment of the present invention a hollow fiber polymer membrane is described, comprising: a polyimide polymer made from the monomers A+B+C;

where A is a dianhydride of the formula;

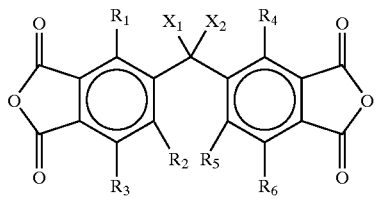

where $X_1$ and $X_2$ are the same or different halogenated alkyl group, phenyl or halogen;

where $R_1$, $R_2$, $R_3$, $R_4$, $R_5$, and $R_6$ are H, alkyl, or halogen;

where B is a diamino cyclic compound without a carboxylic acid functionality;

where C is a diamino cyclic compound with a carboxylic acid functionality; and wherein the ratio of B to C is between 1:4 and 8:1, and wherein said hollow fiber polymer membrane material further comprises at least some covalent ester crosslinks.

A particularly preferred embodiment of the present invention relates to using the crosslinked hollow fiber polymer membrane of the present invention for the separation of carbon dioxide ($CO_2$) from methane ($CH_4$). In particular this embodiment of the invention relates to the removal of $CO_2$ from natural gas comprising $CO_2$, $CH_4$, and other gases.

Among other factors, the present invention provides the composition of and the method of making a highly effective polymeric membrane for the separation of mixtures. The invention utilizes crosslinking of the polymer membrane to help achieve the high selectivity required to make the separation efficiently and to maintain the high selectivities and other properties even after being exposed to extreme conditions such as high temperatures and pressures. The invention also shows that plasticization of the polymer membrane can be avoided by appropriate degrees of crosslinking and appropriate selection of the crosslinking units. It has also been determined that too much crosslinking can lead to hollow fibers that are brittle and subject to failure. Another feature of the present invention is that the selection of polymer having a proper molecular weight (MW) can be important in the formation of a hollow fiber membrane. It is preferable to have a MW above the entanglement molecular weight of the polymer. It has been found that if the molecular weight of the polymer is too low the polymer is too brittle and a proper skin layer may not form. If the molecular weight is too high processability can become difficult. It is preferable to have an average molecular weight of between 20,000 and 200,000. The present invention has thus achieved a hollow fiber polymer membrane that is both highly selective and highly permeable for the preferred separations while also being stable and durable for long term use in a commercial separation process at practical working conditions. The present invention also provides a method of making a hollow fiber polymer membrane material that is not excessively fragile, thereby allowing effective spinning.

A preferred method for preparing hollow fibers is to dissolve the polymer in a solvent or melt the polymer, and extrude the polymer through an annular capillary nozzle with a core fluid used for the purpose of retaining the hollow fiber geometry.

Any gases that differ in size and condensability, for example nitrogen and oxygen or carbon dioxide and methane, can be separated using the membranes described herein. In one embodiment, a gaseous mixture containing methane and carbon dioxide can be enriched in methane by a gas-phase process through the membrane. In other embodiments, the membranes can be used to purify helium, hydrogen, hydrogen sulfide, oxygen and/or nitrogen.

BRIEF DESCRIPTION OF THE DRAWINGS

FIG. 1 shows the Monoesterification and Transesterification Reactions.

FIG. 2 shows the synthesis of the monoester via the acid chloride copolyimide route.

FIG. 3 is a proton NMR of an uncrosslinked polymer (pre-esterification).

FIG. 4 is a proton NMR of the same polymer as FIG. 3 that has been monoesterified with 1,4-butanediol.

FIG. 5 is a proton NMR of a polymer that has been monoesterified with ethylene glycol.

FIG. 6 is a Single Fiber Test Module.

FIG. 7 is a permeation testing system for membrane fiber modules.

FIG. 8 shows the $CO_2$ permeability at increasing pressures for a crosslinked material.

FIG. 9 shows the $CO_2$ permeability at increasing pressures for an uncrosslinked material.

DETAILED DESCRIPTION OF THE INVENTION

The present invention relates to a highly durable hollow fiber membrane exhibiting both high permeability of $CO_2$ and high $CH_4/CO_2$ selectivity and being resistant to plasticization. Prior membranes have shown a significant decline in selectivity over time. Not to be limited by theory, it is believed that the selectivity losses associated with exposure to high levels of $CO_2$ or other plasticizing agents are the result of plasticization. Carbon dioxide acts as a strong swelling agent, sorbing into the polymer matrix and greatly increasing segmental motion. This increased motion drastically reduces the difference in diffusion rates between fast and slow gas species. If this swelling and segmental motion could be limited, the selectivity of the membrane can be maintained. In the present invention crosslinking has been shown to reduce or eliminate $CO_2$ plasticization in dense films. Proper selection of the method of crosslinking, the chemical structure of the polymer and crosslinking agent, and proper degree of crosslinking are important to manufacture a hollow fiber membrane that achieves and maintains the superior permeability and selectivity needed for a viable commercial membrane.

The polymeric fiber used is any suitable polyimide spun by any conventional method, e.g., spun from a polymer solution through a spinneret. The polyimide is derived from a reaction of any suitable reactants. Reactants can include monomers such as dianhydrides, as well as tetra carboxylic acids, and furandiones. Other monomers include diamino compounds, preferably diamino cyclic compounds, still more preferably diamino aromatics. The diamino aromatics can include aromatic compounds having more than one aromatic ring where the amino groups are on the same or different aromatic ring. In the present invention it is also important for the polyimide to have incorporated in it a predetermined amount of crosslinkable sites. These sites may include but are not limited to carboxylic acid sites, ester functions, —OH groups, unreacted $NH_2$ groups, —SH groups, amide functions, and olefins. The preferred crosslinkable sites in the process of the present invention are carboxylic acid or ester groups, alcohols, and olefins. Crosslinking can also be induced by reaction of the imide function itself to form a crosslinkable site and an amide. Another preferred feature of the process of the present invention is that the polyimide chains have limited rotational ability. One such monomer that provides a polyimide chain with limited rotational ability is:

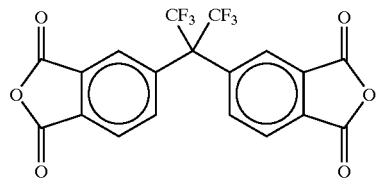

This dianhydride is known as 6FDA or 4,4'-(hexafluoroisopropylidene) diphthalic anhydride, or (2,2-bis (3,4-dicarboxyphenyl)hexafluoropropane dianhydride.

In the process of the present invention a carboxylic acid functionality is intended to include the acid group itself as well as acid derivatives such as esters and anhydrides as well as activated carboxylic acid derivatives such as acid chlorides.

A preferred monomer for providing the carboxylic acid functionality in the present invention is diamino benzoic acid:

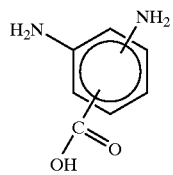

A particularly preferred monomer is 3,5 diaminobenzoic acid:

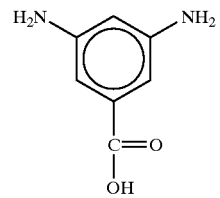

The diamino cyclic compounds without a carboxylic acid functionality can include aromatic compounds having more than one aromatic ring where the amino groups are on the same or different aromatic ring. Preferred examples include but are not limited to 4,4' isopropylidene dianiline, 3,3' hexafluoroisopropylidene dianiline, 4,4' hexafluoroisopropylidene dianiline, 4,4' oxydianiline, 3,3' oxydianiline and 4,4' diaminodiphenyl. Examples of diamino aromatic compounds useful in the present invention include diaminotoluene, diaminobenzotrifluoride, and di, tri, and tetramethyldiaminobenzene.

The polymer membranes of the present invention can be used for gas/gas separations, gas/liquid separations, liquid/liquid separations, and liquid/solid separations.

As mentioned above one of the preferred crosslinkable sites comprise carboxylic acid or esters or activated carboxylic acid derivatives. Crosslinking groups or agents that have been found to be useful in conjunction with the carboxylic acid functional sites include: diols selected from the group consisting of ethylene glycol, propylene glycol (1,2 propanediol), 1,3 propanediol, 1,4 butanediol, 1,2 butanediol, benzenedimethanol, and 1,3 butanediol. Preferred crosslinking agents include ethylene glycol, propylene glycol, 1,3 propanediol, and benzenedimethanol. More preferred crosslinking agents are ethylene glycol, propylene glycol and 1,3 propanediol. Still more preferred crosslinking agents are ethylene glycol, and 1,3 propanediol. It has been found that having too long a crosslinking group can have an undesirable impact on the permeability and/or selectivity of the polymer however too short a crosslinking group can also have a negative effect on the finished hollow fiber membrane. The most preferred crosslinking agents for crosslinking carboxylic acid or ester sites is 1,3 propanediol.

Crosslinking can occur by the condensation reaction of selected diols with the crosslinkable acid functionality. In the process of the present invention it has been found that reaction of less reactive crosslinking agents can be facilitated by activation of the carboxylic acid site on the polymer chain. One way to do this is by converting the acid group to the corresponding acid chloride. This can be effectively done by the use of thionyl chloride. A method for this activation will be discussed in more detail in the examples.

In a preferred embodiment of the process of the present invention crosslinking can be achieved in a stepwise fashion by first monoesterification of the acid function with the selected diol or diols, followed by transesterification of the monoester to the diester. (See FIG. 1)

In a particularly preferred embodiment of the present invention the monoesterified polymer is spun into the hollow fiber prior to transesterification to form the crosslinked hollow fiber membrane. There are significant advantages to this process in particular the monoester polymer can be more easily spun without breaking or forming defects.

It has been found transesterification can be accomplished by heating of the monoesterified polymer. In a particularly preferred embodiment of the present invention, where the hollow fiber is spun prior to the transesterification to form the final crosslinked hollow fiber, care needs to be taken to avoid damage to the hollow fiber. Preferably heating is at a temperature high enough to cause substantial crosslinking but not so high as to cause deformation of the hollow fiber. Most preferably the hollow fiber is not heated above about 200 degrees C.

Crosslinking can be facilitated by various means such as heating, UV treatment, microwaves, catalytic etc.

Alcohol or —OH groups can also provide crosslinkable sites in the present invention. Crosslinking groups useable with alcohol crosslinkable sites include dicarboxylic acids, anhydrides, and diesters. Examples of dicarboxylic acids useful as crosslink groups include but are not limited to oxalic acid, malonic acid, succinic acid, methylsuccinic acid, glutaric acid, and adipic acid. Non limiting examples of anhydrides that may be used include maleic anhydride, succinic anhydride, and methylsuccinic anhydride. Non limiting examples of diesters are dimethylterephthalate, dimethylisophthalate, dimethylphthalate, and diesters of the dicarboxylic acids mentioned above. The dicarboxylic acids and anhydrides can be reacted with the —OH containing polyimide at esterification conditions to form a crosslink. Likewise the diesters discussed above can be subjected to transesterification conditions in the presence of the —OH containing polyimide to form the desired ester crosslink.

In a preferred embodiment of the present invention the —OH containing polyimide is subjected to monoesterification conditions in the presence of one or more of the crosslinking groups to form a monoesterified polyimide. It has been found that the monoesterified polyimide can then be made into a hollow fiber. The hollow fiber can then be subjected to transesterification conditions after hollow fiber formation to form the crosslinked hollow fiber polymer membrane.

Examples of reactants that can be used to provide an —OH containing polyimide include diaminobenzyl alcohol, diaminocyclohexanol, and other diaminoalcohols.

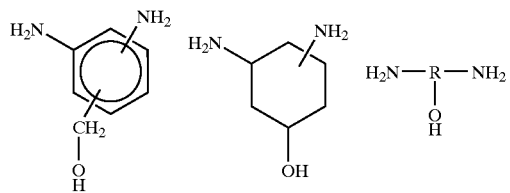

In some cases it may be preferable to protect the —OH function prior to formation of the polyimide. This may be done by conventional chemical means such as by masking the —OH group as an ether. The masked —OH group may then be hydrolyzed back to a functional —OH group prior to crosslinking or prior to the extrusion of the hollow fiber.

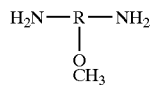

Also mentioned above are crosslinkable sites comprising olefins. Crosslinking groups useable with olefins include but are not limited to sulfur, and divinylbenzene. Sulfur as a crosslinking agent is thought to form a disulfide crosslink when reacted with an olefin.

A particularly preferred diamino group that can be used to make a crosslinkable polyimide polymer is diaminobenzoic acid. The most preferred isomer is 3,5 diaminobenzoic acid (DABA).

Polymer Selection

An appropriately selected polymer can be used which permits passage of the desired gases to be separated, for example carbon dioxide and methane. Preferably, the polymer permits one or more of the desired gases to permeate through the polymer at different diffusion rates than other components, such that one of the individual gases, for example carbon dioxide, diffuses at a faster rate through the polymer. In a preferred embodiment, the rate at which carbon dioxide passes through the polymer is at least 10 times faster than the rate at which methane passes through the polymer.

It is preferred that the membranes exhibit a carbon dioxide/methane selectivity of at least about 5, more preferably at least about 10, still more preferably at least 20, and most preferably at least about 30. Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motion that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature (Tg) is the dividing point between the rubbery or glassy state. Above the Tg, the polymer exists in the rubbery state; below the Tg, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures (Tg>150° C.).

In rigid, glassy polymers, the diffusive selectivity tends to dominate, and glassy membranes tend to be selective in favor of small, low-boiling molecules. The preferred membranes are made from rigid, glassy polymer materials that will pass carbon dioxide preferentially over methane and other light hydrocarbons. Such polymers are well known in the art and are described, for example, in U.S. Pat. No. 4,230,463 to Monsanto and U.S. Pat. No. 3,567,632 to DuPont. Suitable membrane materials include polyimides, polysulfones and cellulosic polymers among others.

Examples of suitable polymers useable as either the membrane material or the porous support include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly (propylene), poly(butene-1), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly (vinyl phosphates), and poly(vinyl sulfates); polyallyls; poly (benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Preferred polymers useable in the hollow fiber membrane of the present invention include polyimides, poyletherimides, polyethersulfones and polysulfones. More preferred polymers useable in the membrane material of present invention include polyimides, poyletherimides, and polysulfones made using analogs of 6FDA. Particularly preferred polyimides useable in the present invention comprise polyimides or polyetherimides made using 6FDA.

In a particularly preferred embodiment of the present invention the hollow fiber polymer membrane is a composite material comprising a membrane layer comprising an effective skin layer as well as a porous support. The porous support material can be the same or different polymer as the membrane. Ideally the porous support is an inexpensive porous polymer. In a composite hollow fiber polymer membrane the porous support layer can be either the inside layer or the outside layer. Most preferably the porous support layer is the inside layer in this embodiment and the "skin" layer is on the outside of the hollow fiber. A composite membrane material is discussed in copending U.S. patent application Ser. Nos. 09/834,857 and 09/834,808 which are incorporated herein in their entirety. A patent that discusses composite membranes is U.S. Pat. No. 4,925,459 which is also incorporated herein by reference in its entirety.

Molecular Weight of the Polymer

Another parameter that needs to be controlled in order to achieve the high permeability, high selectivity hollow fiber membrane of the present invention is the molecular weight of the polymer material. Molecular weight of the polymer material can be critical to forming a hollow fiber membrane that is not too brittle and has an effective skin layer. Molecular weight of the polymer material can also be critical in achieving a spinnable dope solution. A feature of the present invention is that the selection of polymer having a proper molecular weight (MW) can be important in the formation of a hollow fiber membrane. It is preferable to have a MW above the entanglement molecular weight of the polymer. It has been found that if the molecular weight of the polymer is too low the polymer is too brittle and an effective skin layer may not form. If the molecular weight is too high processability can become difficult. In the present invention it is preferable to have an average polymer molecular weight of between 20,000 and 200,000, more preferably between 30,000 and 160,000, still more preferably between 40,000 and 140,000, and most preferably between 60,000 and 120,000. Not to be limited by theory, it is thought that the MW of the polymer should be above, ideally well above, the entanglement MW of the polymer in order to achieve a material that has high strength and is not brittle. A paper that discusses the effect of molecular weight on polymer properties such as entanglement is in *Fundamental Principles of Polymeric Materials*, SPE Monograph Series $2^{nd}$ ed., John Wiley & Sons, New York: (1982), page 259 written by Stephen L. Rosen; the contents of which are hereby incorporated by reference, for background and review.

It is also believed that the molecular weight of the polyimide chain can be degraded during the monoesterification process. A sufficiently high molecular weight polymer should be used to allow for some loss of MW during the esterification process yet still be within the desired range after completion. The molecular weights used in the present application are Weight Average Molecular Weights and can be determined by GPC (Gel Permeation Chromatography).

Separation Systems Including the Membranes

The membranes may take any form known in the art, for example hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours. Contact may also be increased by altering the gaseous flow by increasing fluid turbulence or swirling.

The preferred glassy materials that provide good gas selectivity, for example carbon dioxide/methane selectivity, tend to have relatively low permeabilities. A preferred form for the membranes is, therefore, integrally skinned or composite asymmetric hollow fibers, which can provide both a very thin selective skin layer and a high packing density, to facilitate use of large membrane areas.

Hollow fibers can be employed in bundled arrays potted at either end to form tube sheets and fitted into a pressure vessel thereby isolating the insides of the tubes from the outsides of the tubes. Devices of this type are known in the art. Preferably, the direction of flow in a hollow fiber element will be counter-current rather than co-current or even transverse.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

The membranes can be included in a separation system that includes an outer perforated shell surrounding one or more inner tubes that contain the membranes. The shell and the inner tubes can be surrounded with packing to isolate a contaminant collection zone.

In one mode of operation, a gaseous mixture enters the separation system via a containment collection zone through the perforations in the outer perforated shell. The gaseous mixture passes upward through the inner tubes.

As the gaseous mixture passes through the inner tubes, one or more components of the mixture permeate out of the inner tubes through the selective membrane and enter the containment collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube.

Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

The membranes are preferably durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are hereby incorporated by reference. Barrier materials may also be used as a pre-filter for removing particulates and other contaminants which may damage the membranes.

Methods of Forming Hollow Fibers

Hollow fibers can be formed, for example, by extruding a polymer solution through an annular capillary nozzle with a core fluid used for the purpose of retaining the hollow fiber geometry. These fibers typically have a diameter similar to a human hair and offer the advantage of very high surface area per unit volume. Industrial hollow fiber membrane modules typically contain hundreds of thousands of individual hollow fibers. Specifically, to maximize productivity, the hollow fibers typically include an ultrathin (<2000 Angstroms) "skin" layer on a porous support. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are hereby incorporated by reference.

Hollow fibers can be employed in bundled arrays potted at either end to form tube sheets and fitted into a pressure vessel thereby isolating the insides of the tubes from the outsides of the tubes. Devices of this type are known in the art. Preferably, the direction of flow in a hollow fiber element will be counter-current rather than co-current or even transverse. Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby gas entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels the gas re-emerges from the hollow fiber bundle through the holes at the opposite end of the spiral wrap and is directed out of the module.

A viscosity enhancing agent or viscosity enhancing salt may be useful for making a spinning solution (dope) suitable for spinning. Viscosity enhancing salts can be most useful when the molecular weight of the polymer is near the low end of the MW range discussed elsewhere in this application. One possible viscosity enhancing salt useable in the present invention is lithium nitrate ($LiNO_3$). The use of a viscosity enhancing salt is taught is Example 7 of the present application. Use of viscosity enhancers and other spinning conditions are also taught in *Polyaramide hollow fibers for $H_2/CH_4$ separation II. Spinning and Properties* by Ekiner and Vassilatos *Journal of Membrane Science* 186 (2001) 71–84 which is hereby incorporated by reference in its entirety.

The standard unit for measuring the permeability of gases through a supported gas separation membrane is the Barrer, which is defined as follows:

$$1 \text{ Barrer} = \frac{10^{-10} \text{ cm}^3(\text{STP}) \times \text{cm}}{\text{cm}^2 \times \text{sec.} \times (\text{cm. Hg})}$$

wherein the flux (flow rate) in units of $cm3/cm^2 \times sec.$; being volume per seconds of permeated gas at standard temperature and pressure, cm is the thickness of the film, $cm^2$ is the area of film, and cm. Hg is the pressure (or driving force).

The selectivity of a supported gas separation membrane in separating a two-component fluid mixture is defined as the ratio of the rate of passage of the more readily passed component to the rate of passage of the less readily passed component. Selectivity may be obtained directly by contacting a supported gas separation membrane with a known mixture of gases and analyzing the permeate. Alternatively, a first approximation of the selectivity is obtained by calculating the ratio of the rates of passage of the two components determined separately on the same gas separation membrane. Rates of passage may be expressed in Barrer units. As an example of selectivity, a $O_2/N_2=10$ indicates that the subject membrane allows oxygen gas to pass through at a rate ten times that of nitrogen.

The productivity (permeance) of a gas separation membrane is measured in GPUs which is defined as follows:

$$GPU = \frac{10^{-6} \times \text{cm}^3(\text{STP})}{\text{cm}^2 \times \text{sec.} \times (\text{cm. Hg})}$$

Purification Process

A mixture containing gases to be separated, for example carbon dioxide and methane, can be enriched by a gas-phase process through the membrane, for example, in any of the above-configurations. The preferred conditions for enriching the mixture involve using a temperature between about 25° C. and 200° C. and a pressure of between about 50 psia and 5000 psia. These conditions can be varied using routine experimentation depending on the feed streams. Other gas mixtures can be purified with the membrane in any of the above configurations. For example, applications include enrichment of air by nitrogen or oxygen, nitrogen or hydrogen removal from methane streams, or carbon monoxide from syngas streams. The membrane can also be used in hydrogen separation from refinery streams and other process streams, for example from the dehydrogenation reaction effluent in the catalytic dehydrogenation of paraffins. Generally, the membrane may be used in any separation process with gas mixtures involving, for example, hydrogen, nitrogen, methane, carbon dioxide, carbon monoxide, helium, and oxygen.

Additional Purification

If additional purification is required, the product in the permeate stream can be passed through additional membranes, and/or the product can be purified via distillation using techniques well known to those of skill in the art. Typically, membrane systems may consist of many modules connected in various configurations (See, for example, Prasad et al., *J. Membrane Sci.*, 94, 225–248 (1994), the contents of which are hereby incorporated by reference for background and review). Modules connected in series offer many design possibilities to purify the feed, permeate, and residue streams to increase the separation purity of the streams and to optimize the membrane system performance.

As discussed above the membrane to be commercially viable must have high permeability of at least one component in combination with excellent selectivity. Preferably the crosslinked polyimide polymer hollow fiber membrane of the present invention has a $CO_2$ permeance of at least 15 GPU and a $CO_2/CH_4$ selectivity of greater than 15, preferably the $CO_2$ permeance is at least 20 GPU and the $CO_2/CH_4$ selectivity is greater than 20, still more preferably the $CO_2$ permeance is greater than 25 and the $CO_2/CH_4$ selectivity is greater than 25, most preferably the $CO_2$ permeance is greater than 25 and the $CO_2/CH_4$ selectivity is greater than 30. The permeability and selectivity of the membrane is measured at 35 degrees C. and a pressure of 100 psia.

Methodology of Fiber Module Construction

For laboratory or commercial use, a suitable plurality of the fibers is bundled together to form a separation unit. The number of fibers bundled together will depend on fiber diameters, lengths, and porosities and on desired throughput, equipment costs, and other engineering considerations understood by those in the chemical engineering arts.

The fibers are held together by any conventional means. This assembly is then typically disposed in a pressure shell such that one end of the fiber assembly extends to one end of the pressure shell and the opposite end of the fiber assembly extends to the opposite end of the pressure shell. The fiber assembly is then fixably or removably affixed to the pressure shell by any conventional method to form a pressure tight seal.

The unit is then operated, e.g., as a shell-tube heat exchanger, where the feed is passed to either the shell or tube side at one end of the assembly and the product is removed from the other end. For maximizing high-pressure performance, the high-pressure feed is typically fed to the shell side of the assembly. At least a portion of the $CO_2$ in the feed passes through the membrane to the tube side, i.e., inside the membranes. $CO_2$ depleted feed is then removed from the opposite end of the shell side of the assembly. Any conventional recycle scheme may be optionally used to optimize a desired purity level.

In order to perform permeation tests, for example, a test module consisting of a single fiber is constructed, as shown in FIG. 6. Details of fabricating the module are given in the Illustrated Embodiments section below.

Operating Conditions

The process is operated with a feed pressure of from about 20 psia to about 4000 psia, preferably at least about 50 psia, and more preferably from about 200 psia to about 1000 psia. The feed temperature is its ambient temperature, e.g., its temperature as produced from the well.

Methodology of Single Fiber Module Construction

Reference is made to FIG. 6. In order to perform permeation tests, a module 200 consisting of a single fiber 205 was constructed. The module 200 is fabricated from two stainless steel (316) Swagelok® ¼-inch tees 210, stainless steel ¼-inch tubing and nuts, two brass NPT ¼-inch female-tube adapters 215, two brass NPT ¼-inch male-tube adapters 220, and two brass Swagelok® ¼-inch nuts. The hollow fiber membrane 205 is threaded through the module housing, so that a length of carbon fiber extends on each end. The ends of the module are then plugged with Stycast® 2651 epoxy 225 (from Emerson-Cuming Company) cured for overnight. The ends of the membrane 205 are snapped off after the epoxy hardens.

Methodology of Membrane Testing System

Reference is made to FIGS. 6 and 7. The permeation testing for the fibers 205 was performed with single-fiber test modules 200. Gas transport through the membranes was examined with a pressure-rise permeation testing system 300. The system permitted high-pressure testing of mixed feed gas and sampling of gas streams with a gas chromatograph. The module 200 was attached in a shell feed method of operation. Mixed feed gas 305 from a compressed gas cylinder 310 was supplied on the shell-side of a single-fiber test module 200. The module 200 and ballast volumes were placed in a circulating water bath 315 to control and maintain a constant temperature.

Vacuum was pulled on both the shell- and bore-side of the hollow fiber membrane 205 first for overnight before testing. Permeate at the two ends from the bore-side of the fiber was pulled by vacuum through a downstream sample volume. The permeation rate was measured from the pressure rise of a Baratron® pressure transducer 320 over time after closing the valve to vacuum. The pressure rise was plotted on chart recorder. The compositions of all the streams can be determined by a gas chromatograph. Individual gas fluxes were then calculated. The plumbing of the system consisted of stainless steel (316) Swagelok® ¼-inch and ⅛-inch fittings and tubing, Whitey® and Nupro® valves with welded elements. The system is rated for over 1500 psia pressure.

EXAMPLES

The present invention will be better understood with reference to the following non-limiting examples. The present examples are intended to help illustrate the process of the present invention and are not meant to limit the scope of the application.

Example 1

Synthesis of Monoester via Activated Carboxylic Acid

The reactivity of the diols strongly depends on their structure. Due to the electron releasing effect of the methylene groups the reactivity of diols increases with increasing chain length. For example, 1,4 butanediol>1,3-propane diol>ethylene glycol.

The monoesterification reaction was carried out as follows: the DABA-copolyimide is dissolved in THF (10 wt %) under nitrogen atmosphere and 2 times of the stoichiometric amount of thionyl chloride is added. The reaction is heated to reflux and the excess of thionyl chloride and THF is distilled out of the reaction solution. The residual copolyimide acid chloride was stored under vacuum at low temperature (50° C.) overnight. The acid chloride was dissolved in THF and dropped slowly to an excess of glycol (70 times excess) dissolved in THF.

Example 2

Self Catalyzed Monoesterification Reaction

Some of the diols such as 1,4 butanediol have been found to form the monoester without the use of a catalyst. For the self-catalyzed reaction, DABA-copolyimides are dissolved in dry NMP (15–17 wt %) and 70 times excess of diol is added. The reaction mixture is stirred for 12 hours at 130° C. under nitrogen purge. Precipitation, blending and filtration lead to fluffy particles of monoester which are dried at 70° C. under vacuum.

Example 3

Acid Catalyzed Monoesterification Reaction

For the acid catalysed reaction, per 2 g of polymer 1 mg of p-toluene sulfonic acid was added. The procedure for the reaction was the same as for the self-catalyzed reaction.

Example 4

Conversion of the Monoesterification Reaction

We have found that $^1$H-NMR is a useful method to show the conversion which can be reached in the monoesterification reaction. This should be explained on two examples. FIG. 3 shows the $^1$H NMR of 6FDA-DAM/DABA 3:2 non-crosslinked in DMSO-D6. The presence of the DABA units can be proven by comparing the ratio of all aromatic protons and aliphatic protons (3 methyl groups of DAM). After the self-catalyzed monoesterification reaction with 1,4-butanediol and low temperature drying of the monoester (70° C. under vacuum), again $^1$H NMR was performed. The spectrum is shown in FIG. 4. For the monoester-NMR we can calculate the conversions of the reaction by the ratio of aromatic protons and aliphatic protons of the methylene group next to the ester group. We can check the calculations also by the ratio of DAM-methyl protons and the methylene group next to the ester group.

From the spectrum obtained after the monoesterification reaction it can be concluded that nearly complete conversions can be obtained with 1,4-butanediol using the self-catalyzed reaction conditions.

As already mentioned we assume that the ethylene glycol is less nucleophilic than the butanediol. It has been found that using ethylene glycol in a self-catalyzed monoesterification reaction, the conversions seem to be much lower. The $^1$H-NMR of the 6FDA-DAM/DABA 2:1 ethylene glycol monoester is shown in FIG. 5.

Table 1 summarizes the results for the conversions obtained with copolyimides having different DAM/DABA compositions. Thereby different methods for synthesizing the monoester copolyimide were investigated. The conversion of the reactions was independently calculated from the ratio of aromatic protons (without the aromatic DAM proton) and the methylene protons next to the ester group as well as from the ratio of the aliphatic DAM methyl protons and the methylene protons next to the ester. The following conclusions can be drawn:

The monoesterification reaction can be catalyzed by protons. Therefore it is obvious that with increasing DABA content of the copolyimide structure higher conversion rates are obtained. The DAM/DABA 4:1 with butanediol shows a conversion of less than 50% whereas for the DAM/DABA 3:2 a conversion of over 90% was obtained (self catalyzed).

Ethylene glycol generally has a lower nucleophilic character than butanediol, the conversion for a DAM/DABA 2:1 composition is rather low (less than 40%) although a high number of protons are present due to the high DABA content.

For DAM/DABA 4:1 monoesterification with ethylene glycol very low conversion was expected (at least less than 40%) in the self-catalyzed reaction due to the low DABA content. By adding p-Toluene sulfonic acid to the monoesterification reaction conversions of more than 80% can be reached.

The acid chloride groups are highly reactive groups, therefore conversions are over 95% for the monoester synthesis over the acid chloride route.

TABLE 1

| Copolyimide Monoester | Ratio: Aromatics (total)/ DAM-CH$_3$ protons | Calculated Conversion based on Aromatics (without DAM/ methylene protons (on ester) | Calculated Conversion based on DAM-CH$_3$ protons/ methylene protons (on ester) |
|---|---|---|---|
| DAM/DABA 4:1 Butanediol Self-catalyzed | theoretical: 1.03 experimental: 1.08 | 22 | 23 |
| DAM/DABA 2:1 Ethylene glycol Self-catalyzed | theoretical: 1.28 experimental: 1.23 | 38 | 40 |
| DAM/DABA 3:2 Butanediol Self-catalyzed | theoretical: 1.44 experimental: 1.50 | 94 | 98 |
| DAM/DABA 3:2 Butanediol Over acid chloride | theoretical: 1.44 experimental: 1.49 | 97 | 98 |

Example 5

Plasticization Resistance

In order to show $CO_2$ plasticization resistance, pure $CO_2$ permeation experiments have been performed with the 6FDA-DAM/DABA 3:2 film crosslinked with 1,4 butanediol at 140° C. To determine the $CO_2$ plasticization the $CO_2$ permeability is measured at increasing $CO_2$ pressure. The $CO_2$ pressure was held at a given pressure for 24 hours then the $CO_2$ permeability was measured. The $CO_2$ pressure was then held for an additional 24 hours and again measured. A substantial increase in the $CO_2$ permeability indicates plasticization. Results of plasticization test are shown in FIG. 8. FIG. 8 shows that the crosslinked material has surprising resistance to plasticization.

Comparative Example 6

Plasticization Resistance of Uncrosslinked Film

To contrast the plasticization resistance of a crosslinked membrane (of Example 5), an uncrosslinked film was tested under similar conditions to Example 5. The results of this test are shown in FIG. 9. FIG. 9 shows a substantial change in the $CO_2$ permeability indicating plasticization.

Example 7

Spinning of Crosslinked Defect Free Asymmetric Hollow Fiber

A spinning solution (dope) containing polyimide, N-methyl-2-pyrilodinone (NMP), ethanol, and a viscosity enhancing salt ($LiNO_3$) was mixed to form a homogenous solution. The polyimide used was made from the 6FDA dianhydride (4,4'-[Hexafluoroisopropylidene]diphthalic anhydride) and a 3:2 ratio of DAM (2,4,6-trimethyl-1,3-phenylene diamine) to DABA (diamino benzoic acid) diamines. Over 98% of the DABA groups had been reacted with propane diol to form the monoester form of the polymer. The dope was rolled in a sealed container for 5 days to ensure complete mixing. The dope was then allowed to degas for 24 hours before being poured into an ISCO® syringe pump, where it was again degassed for 24 hours.

The dope was extruded from an annular spinneret at 0.8 mL/min through an air gap into a quench bath filled with deionized water and taken up on a rotating drum at between 14 and 16 m/min. A solution consisting of 90% NMP with 10% water was used as the bore fluid. The fibers were kept wetted with DI water while on the take-up drum. The fibers were cut from the drum with a razor to lengths of one meter and washed in Dl water for 24 hours.

After washing in water, the fibers were washed in baths of ethanol (2×30 min) and hexane (2×30 min). The hexane-wet fibers were allowed to air dry for 30 minutes and then dried under vacuum at 120° C. for one hour.

The fibers were crosslinked by exposure to 150° C. for 25 hours under vacuum. They were subsequently potted into modules and tested for permeation properties.

Example 8

Testing of Crosslinked Hollow Fibers

Crosslinked fibers (see Example 7) were potted into modules, each containing 5–10 fibers with an active length of approximately 20 cm. Pure gases were fed on the shell side at 50 psig and the flux through the fibers was measured with bubble flow meters. Atmospheric pressure was maintained on the downstream side and the overall temperature was near 25° C. The flux measured with the bubble flow meters was converted to permeance and the results are shown in the table below.

| | |
|---|---|
| $N_2$ permeance (GPU) | 1.7 |
| $O_2$ permeance (GPU) | 6.5 |
| He permeance (GPU) | 52 |
| $CH_4$ permeance (GPU) | 1.1 |
| $CO_2$ permeance (GPU) | 23 |
| $O_2/N_2$ selectivity | 3.8 |
| $He/N_2$ selectivity | 31 |
| $CO_2/CH_4$ selectivity | 21 |

High pressure nitrogen was used to test the crush pressure of the fibers. Using the same setup described above, nitrogen was fed on the shell side, beginning at 50 psig. The pressure was increased every 30 minutes in 50 psig increments and the permeance was measured. A drastic change in permeance after increasing the pressure is indicative of fiber collapse. The fibers maintained their structural integrity up to 900 psig of pure nitrogen.

Plasticization resistance of the fibers was tested using a similar procedure to that used in crush testing. In this case, the test gas was $CO_2$, pressure was increased every 60 minutes, and permeance measurements were taken every 30 minutes (after 30 and 60 minutes of exposure to a given pressure). Plasticization was indicated by a sharp increase in the slope of the permeance vs. pressure curve. For the crosslinked fibers, this occurred at about 250 psig of pure $CO_2$, as compared to less than 50 psig for uncrosslinked fibers of the same material.

What is claimed is:

1. A hollow fiber polymer membrane, comprising:
   a crosslinked polyimide polymer having covalent ester crosslinks; and having
   a $CO_2$ permeance of at least 20 GPU and a $CO_2/CH_4$ selectivity of greater than 20, at 35 degrees C. and a pressure of 100 psia.

2. The hollow fiber polymer membrane of claim 1 wherein the polyimide is 6FDA.

3. The hollow fiber polymer membrane of claim 1 wherein the covalent ester crosslinks are formed by the monoesterification of an uncrosslinked polyimide polymer having carboxylic acid sites incorporated therein, with a diol, followed by transesterification, to form a crosslinked polyimide polymer.

4. The hollow fiber polymer membrane of claim 3 wherein the diol is selected from the group consisting of ethylene glycol, propylene glycol, 1,3 propanediol, 1,4 butanediol, 1,2 butanediol, benzenedimethanol, and 1,3 butanediol.

5. A hollow fiber polymer membrane, comprising:
   a crosslinked polyimide polymer having at least some covalent ester crosslinks and having a ratio of crosslinkable sites to imide groups of between 3:8 and 1:16.

6. A hollow fiber polymer membrane, comprising:
   a polyimide polymer made from the monomers A+B+C; where A is a dianhydride of the formula;

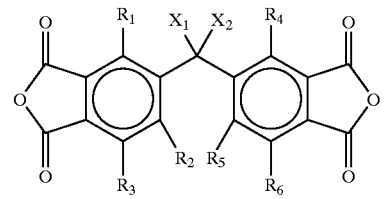

where $X_1$ and $X_2$ are the same or different halogenated alkyl group, phenyl or halogen;
where $R_1$, $R_2$, $R_3$, $R_4$, $R_5$, and $R_6$ are H, alkyl, or halogen;
where B is a diamino cyclic compound without a carboxylic acid functionality;
where C is a diamino cyclic compound with a carboxylic acid functionality; and
wherein the ratio of B to C is between 1:4 and 8:1, and wherein said hollow fiber polymer membrane further comprises at least some covalent ester crosslinks.

7. The hollow fiber polymer membrane of claim 6 where $X_1$ and $X_2$ are $CF_3$.

8. The hollow fiber polymer membrane of claim 6 where $R_1$, $R_2$, $R_3$, $R_4$, $R_5$, and $R_6$ are H.

9. The hollow fiber polymer membrane of claim 6 wherein the dianhydride is 6FDA.

10. The hollow fiber polymer membrane of claim 6 wherein C is DABA.

11. The hollow fiber polymer membrane of claim 6 wherein B is a diamino aromatic compound.

12. The hollow fiber polymer membrane of claim 6 wherein B is a methyl substituted diamino benzene.

13. The hollow fiber polymer membrane of claim 6 wherein the ratio of B to C is between 17:3 and 3:2.

14. The hollow fiber polymer membrane of claim 6 wherein the ratio of B to C is between 17:3 and 3:1.

15. The hollow fiber polymer membrane of claim 6 wherein said ester crosslinks are made using a diol selected from the group consisting of ethylene glycol, propylene glycol, 1,3 propanediol, 1,4 butanediol, 1,2 butanediol, benzenedimethanol, and 1,3 butanediol.

16. The hollow fiber polymer membrane material of claim 15 wherein the ester crosslinks are made by formation of a monoester, at monoesterification conditions, followed by formation of the ester crosslinks by transesterification of the monoester, at transesterification conditions to from a crosslinked hollow fiber polymer membrane.

17. The hollow fiber polymer membrane material of claim 6 wherein the ratio of B to C is between 4:1 and 3:2.

18. The hollow fiber polymer membrane of claim 6 wherein the polyimide polymer has an average molecular weight of between 20,000 and 200,000.

19. The hollow fiber polymer membrane material of claim 6 wherein the membrane material has an average molecular weight greater than the entanglement MW of the polymer.

20. The hollow fiber polymer membrane material of claim 6 wherein the membrane material has an average molecular weight of between 40,000 and 140,000.

21. A method of making a crosslinked hollow fiber membrane, comprising:

preparing a polyimide polymer comprising a predetermined quantity of crosslinkable sites; treating the polyimide polymer with a diol selected from the group consisting of ethylene glycol, propylene glycol, 1,3 propanediol, 1,4 butanediol, 1,2 butanediol, and 1,3 butanediol, at esterification conditions, to form a monoesterified polymer; forming a monoesterified hollow fiber from the monoesterified polymer; and subjecting the monoesterified hollow fiber to transesterification conditions to form a covalently crosslinked hollow fiber membrane.

22. The method of making a crosslinked hollow fiber membrane of claim 21 wherein the polyimide polymer is treated with a diol in the presence of an esterification catalyst.

23. A method of making a crosslinked hollow fiber membrane, comprising:

preparing a polyimide polymer comprising a predetermined quantity of crosslinkable sites;

forming a hollow fiber from said polyimide polymer;

treating the hollow fiber with a diol selected from the group consisting of ethylene glycol, propylene glycol, 1,3 propanediol, 1,4 butanediol, 1,2 butanediol, and 1,3 butanediol, at esterification conditions, to form a monoesterified hollow fiber; and subjecting the monoesterified hollow fiber to transesterification conditions to form a crosslinked hollow fiber membrane.

* * * * *